United States Patent
Tokatyan et al.

(10) Patent No.: US 10,056,080 B2
(45) Date of Patent: Aug. 21, 2018

(54) IDENTIFYING CONTACTS USING SPEECH RECOGNITION

(71) Applicant: Ford Global Technologies, LLC, Dearborn, MI (US)

(72) Inventors: Shant Tokatyan, Foster City, CA (US); Shounak Athavale, San Jose, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/296,632

(22) Filed: Oct. 18, 2016

(65) Prior Publication Data

US 2018/0108350 A1   Apr. 19, 2018

(51) Int. Cl.
| | |
|---|---|
| *G10L 15/00* | (2013.01) |
| *G10L 15/22* | (2006.01) |
| *G10L 15/30* | (2013.01) |
| *G10L 15/26* | (2006.01) |
| *G10L 15/02* | (2006.01) |
| *G10L 25/51* | (2013.01) |

(52) U.S. Cl.
CPC .............. *G10L 15/22* (2013.01); *G10L 15/02* (2013.01); *G10L 15/26* (2013.01); *G10L 15/30* (2013.01); *G10L 25/51* (2013.01)

(58) Field of Classification Search
CPC ............................... G10L 25/00; G10L 21/00
USPC .................................... 704/233, 9, 270, 273
See application file for complete search history.

(56) References Cited

U.S. PATENT DOCUMENTS

| | | | | |
|---|---|---|---|---|
| 5,463,715 A | * | 10/1995 | Gagnon | G10L 13/07 704/258 |
| 5,848,130 A | * | 12/1998 | Rochkind | G10L 21/04 379/88.01 |
| 8,103,506 B1 | * | 1/2012 | Meyer | G06F 17/27 704/237 |
| 8,886,540 B2 | * | 11/2014 | Cerra | G10L 15/183 379/142.14 |
| 9,148,499 B2 | | 9/2015 | Smadi | |
| 2003/0114202 A1 | | 6/2003 | Suh | |

(Continued)

FOREIGN PATENT DOCUMENTS

WO     WO-201614970 A1     1/2016

OTHER PUBLICATIONS

Entune Audio—Advanced Voice Recognition, http://www.loyota.com/entune/support/ea/voice-recognition/hands-free-calling-by-dial/make-a-call-by-history/#!/advanced-voice-recogn.

*Primary Examiner* — Michael Colucci
(74) *Attorney, Agent, or Firm* — David R. Stevens; Stevens Law Group

(57) ABSTRACT

A system receives candidate strings from a speech recognition engine. Where the speech recognition indicates success, the candidate string may be reported or otherwise used. Otherwise, candidate strings may be processed by comparing collapsed forms of the candidate strings to collapsed forms of a user's contacts. The collapsed form may replace contiguous consonants with a 1 and contiguous vowels with a 0. If a candidate string has a collapsed form matching a contact's collapsed form, that contact may be used. Where multiple candidate strings match the collapsed forms of multiple contacts, the contacts may be filtered according to textual similarity to the candidate strings, proximity to a typical usage location for the contacts, and a typical usage time for the contacts.

16 Claims, 5 Drawing Sheets

(56) References Cited

U.S. PATENT DOCUMENTS

| | | | | |
|---|---|---|---|---|
| 2004/0176078 A1* | 9/2004 | Melnar | ............... | H04M 3/42 |
| | | | | 455/414.1 |
| 2007/0239433 A1* | 10/2007 | Chaski | ............... | G06F 17/27 |
| | | | | 704/9 |
| 2007/0265829 A1* | 11/2007 | Turner | ............... | G06F 17/27 |
| | | | | 704/9 |
| 2008/0126089 A1* | 5/2008 | Printz | ............... | G06Q 30/02 |
| | | | | 704/235 |
| 2013/0262096 A1* | 10/2013 | Wilhelms-Tricarico | ............... | |
| | | | | G10L 25/90 |
| | | | | 704/202 |
| 2013/0317817 A1* | 11/2013 | Ganong, III | ............ | G10L 13/00 |
| | | | | 704/235 |
| 2013/0325442 A1* | 12/2013 | Dahlmeier | ............ | G06F 17/274 |
| | | | | 704/9 |
| 2014/0032220 A1* | 1/2014 | Lerner | ............... | G10L 17/24 |
| | | | | 704/273 |
| 2015/0142428 A1 | 5/2015 | Zhao | | |

\* cited by examiner

IDENTIFYING CONTACTS USING SPEECH RECOGNITION

BACKGROUND

Field of the Invention

This invention relates to identifying contacts based on speech inputs.

Background of the Invention

Mobile devices and in-vehicle infotainment (IVI) systems often seek to provide recognition of spoken commands and other inputs. However, voice recognition engines have a difficult time identifying unique names and words. For example, getting a voice recognition system to identify an unusually spelled name can cause misinterpretation of voice commands.

The systems and methods disclosed herein provide an improved approach for identifying names in voice commands.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
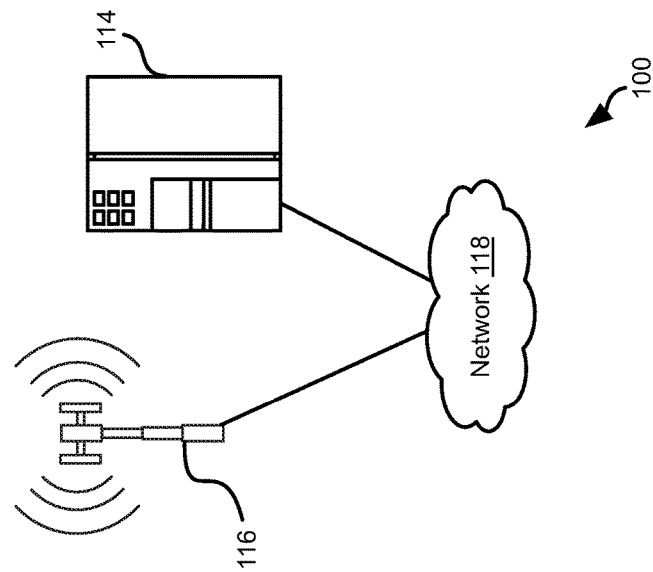
FIG. 1 is a schematic block diagram of an environment in which to implement systems and methods in accordance with an embodiment of the present invention.
Figure 1:
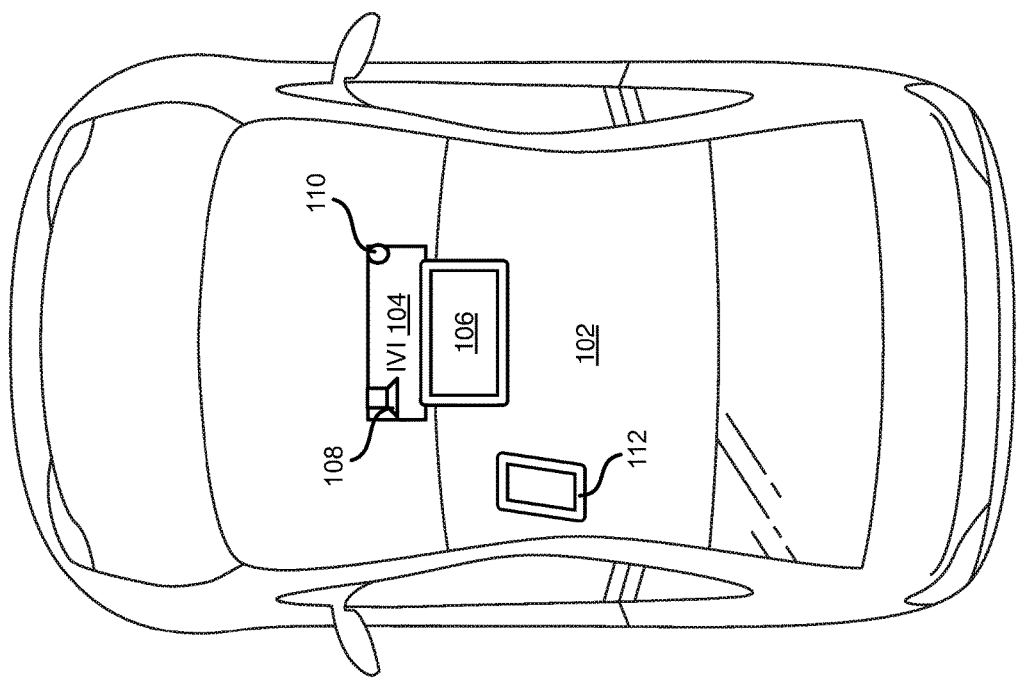

Referring to FIG. 1, an environment 100 in which methods described herein may be implemented may include a vehicle 102 having an in-vehicle infotainment (IVI) system 104. The IVI system 104 may have some or all of the attributes of a general purpose computing device. The IVI system 104 may be coupled to a screen 106 that may be embodied as a touch screen. One or more speakers 108 may be coupled to the IVI system 104. One or more microphones 110 may be coupled to the IVI system 104.

As known in the art, the IVI system 104 may be programmed to provide an interface for selecting audio content to be played back using the speakers 108 or other audio outputs. Audio content may be selected from one or more sources of audio content coupled to the IVI system 104, such as radio, compact disc (CD) player, and the like. The IVI system 104 may further display video content on the screen 106 or one or more other screens disposed within the vehicle 102. The IVI system 104 may display video content selected from one or more sources of video content, such as a DVD player, paired mobile device, or other source of video data.

The IVI system 104 may further be coupled to one or more systems of the vehicle 102 itself and enable the display of status information for the vehicle 102 and receiving inputs modifying the operation of one or more systems of the vehicle 102 itself, such a climate control, engine operating parameters, and the like.

The IVI system 104 may implement a voice control system whereby outputs of the microphone 110 are interpreted into commands for controlling operation of the IVI system 104 or one or more systems of the vehicle 102 through the IVI system 104. For example, the IVI system 104 may implement the FORD SYNC voice control system. The controller 104 may receive control inputs from the IVI system 104 and provide outputs for display on the screen 106 of the IVI system 104.

A vehicle 102 typically conveys a driver and one or more passengers. A driver or passenger may bring a mobile device 112 in the vehicle 102. The mobile device 112 of the driver or a passenger may pair with the IVI system 104, such as through BLUETOOTH or some other wireless protocol. In some embodiments, control inputs and content may be received through the mobile device 112 and forwarded to the IVI system 104. In such embodiments, the mobile device 112 may implement a voice control system and include a microphone and speaker for receiving inputs and providing audible feedback. Accordingly, although the methods disclosed herein are disclosed being performed by an IVI 104, they may also be implemented using a mobile device 112.

In some embodiments, the IVI 104 may communicate with a server system 114. For example, the IVI 104 may communicate with the server system 114 using built-in wireless communication capabilities, the mobile device 112, or some other device.

Communication with the server system 114 may be facilitated by a network of cellular communication towers 116. The cellular communication towers 116 may also be in data communication with the server system 114, such as by means of a network 118. The network 118 may be include some or all of a local area network (LAN), wide area network (WAN), the Internet, and any other wired or wireless network connection.

In some embodiments, some or all of the methods disclosed herein are implemented by the server system 114, with results being communicated to the IVI 104 or the mobile device 112.

Figure 2:
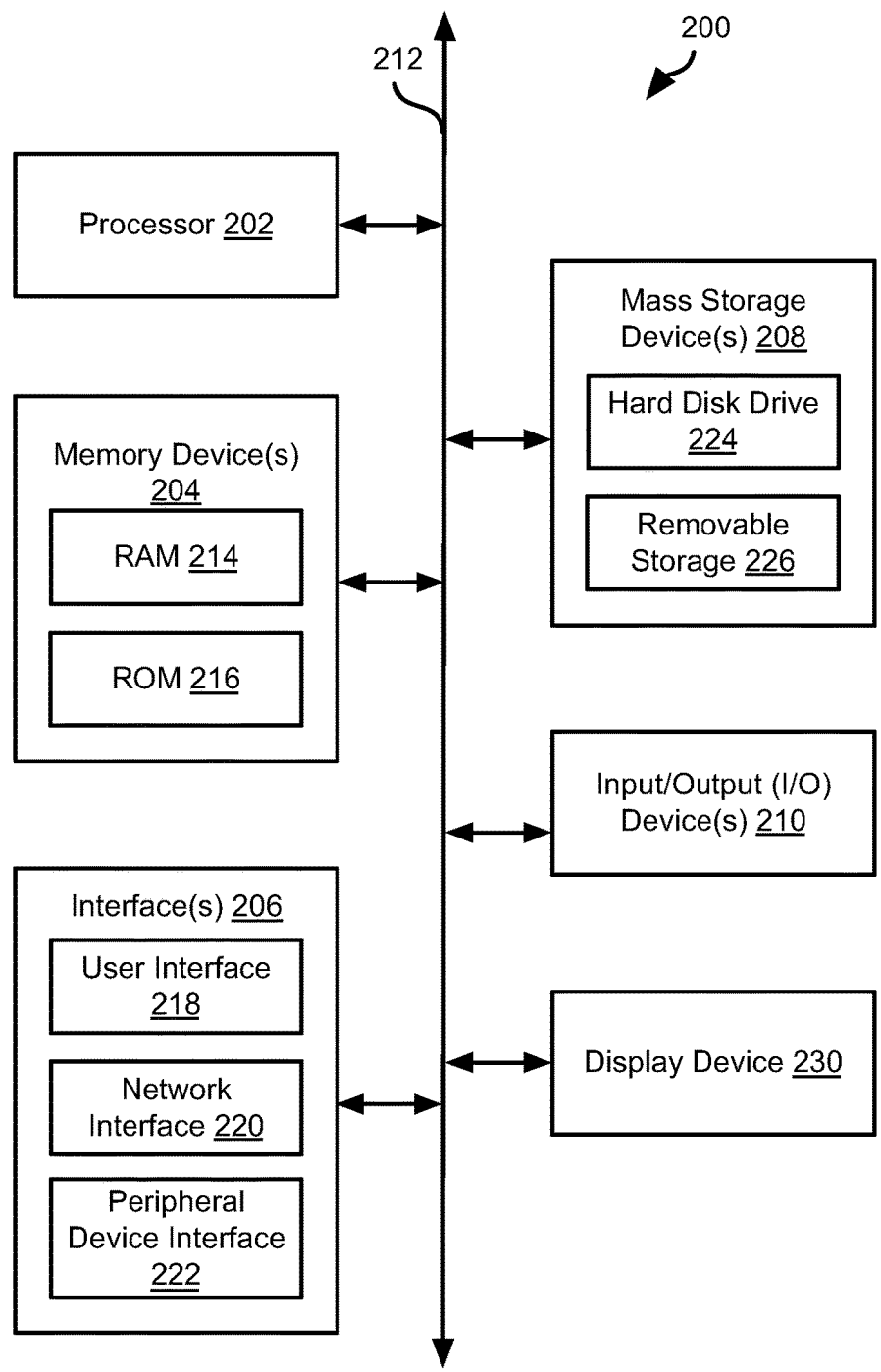
FIG. 2 is a schematic block diagram of an example computing device suitable for implementing methods in accordance with embodiments of the present invention.

FIG. 2 is a block diagram illustrating an example computing device 200. Computing device 200 may be used to perform various procedures, such as those discussed herein. The IVI system 104, mobile device 112, and server system 114 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
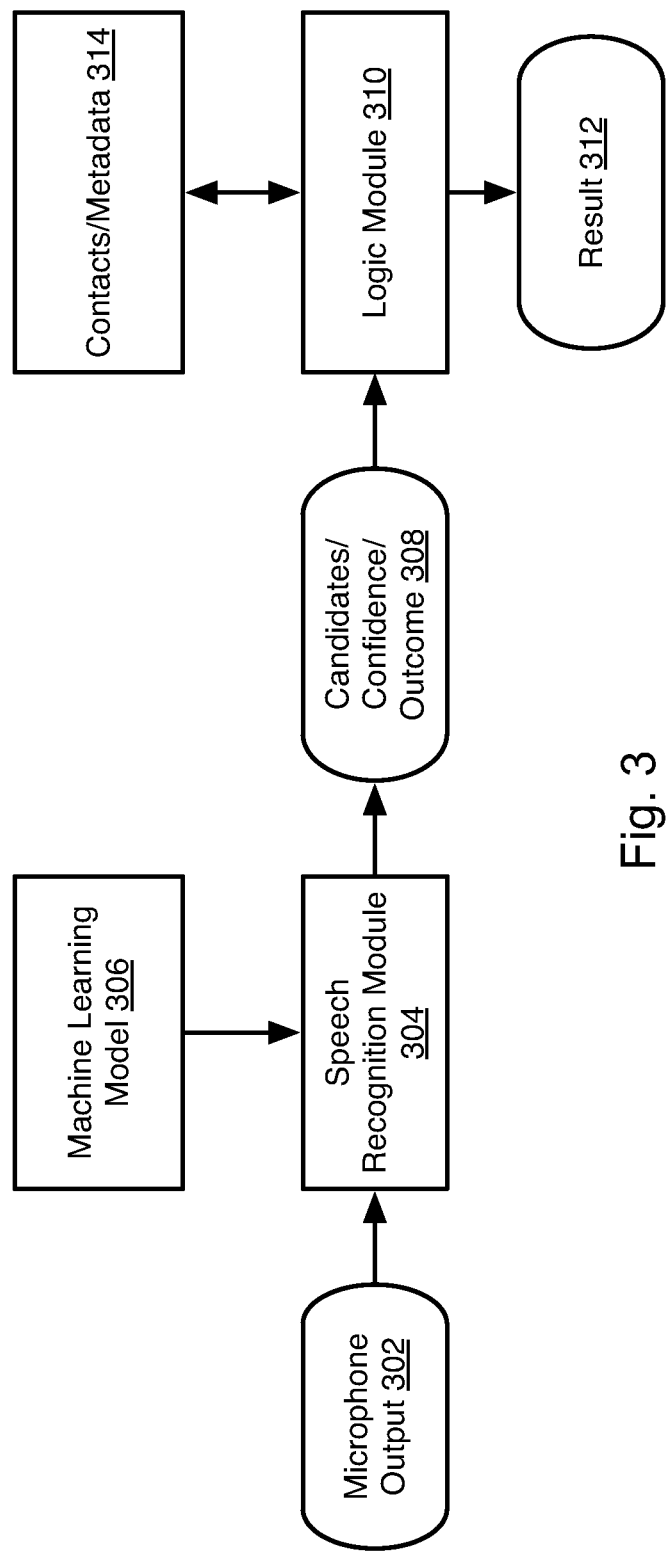
FIG. 3 is schematic block diagram illustrating components implementing methods in accordance with an embodiment of the present invention.

Referring to FIG. 3, the illustrated components may be used to implement methods in accordance with an embodiment of the invention. An output 302 of the microphone, e.g. a digital representation of the output of the microphone 110, may be input to a speech recognition module 304. The speech recognition module 304 may be executed by the IVI system 104, the mobile device 112, or the server system 114. For example, the output 302 may be transmitted to the server system 114 for voice analysis and the results of the analysis returned to the IVI system 104 or mobile device 112.

The speech recognition module 304 may be any speech recognition algorithm known in the art and may be a machine-learning algorithm that relies on a machine learning model 306 that is trained using libraries of training data.

The result of processing by the speech recognition module 304 may be a set of candidate strings 308. In the examples disclosed herein, the recognition of hard-to-identify names is a particularly useful application. Accordingly, the candidate strings 308 may be names estimated by the speech recognition module 304 as corresponding to the speech recorded in the output 302. In some embodiments, the candidate strings 308 may each have a confidence score indicating likelihood that the candidate string is a correct interpretation of the output 302, e.g. a value between 0 to 1, with a larger value indicating greatest certainty. In some embodiments, the candidate strings 308 may be those having confidence scores exceeding a threshold and/or the top N scores (e.g. 3-10).

In some embodiments, two thresholds may be used. A first threshold indicating successful interpretation and a second threshold indicating a low confidence but potentially relevant result. Accordingly, the candidate strings may include a single successful candidate string that meets the first threshold or multiple candidate strings that meet the second threshold but not the first threshold.

The candidate strings 308 may be input to a logic module 310, such as when the candidate strings 308 have confidence scores that are below the first threshold. The logic module 310 may execute the method of FIG. 4. The output of the logic module 310 may include a result 312 that is a string determined to have a high likelihood of corresponding to the output 302.

The logic module 310 may store contacts 314 for a user and metadata for the contacts of the user and other strings processed by the logic module 310. As described below with respect to FIG. 4, the metadata may be both used and updated by the logic module 310.

Figure 4:
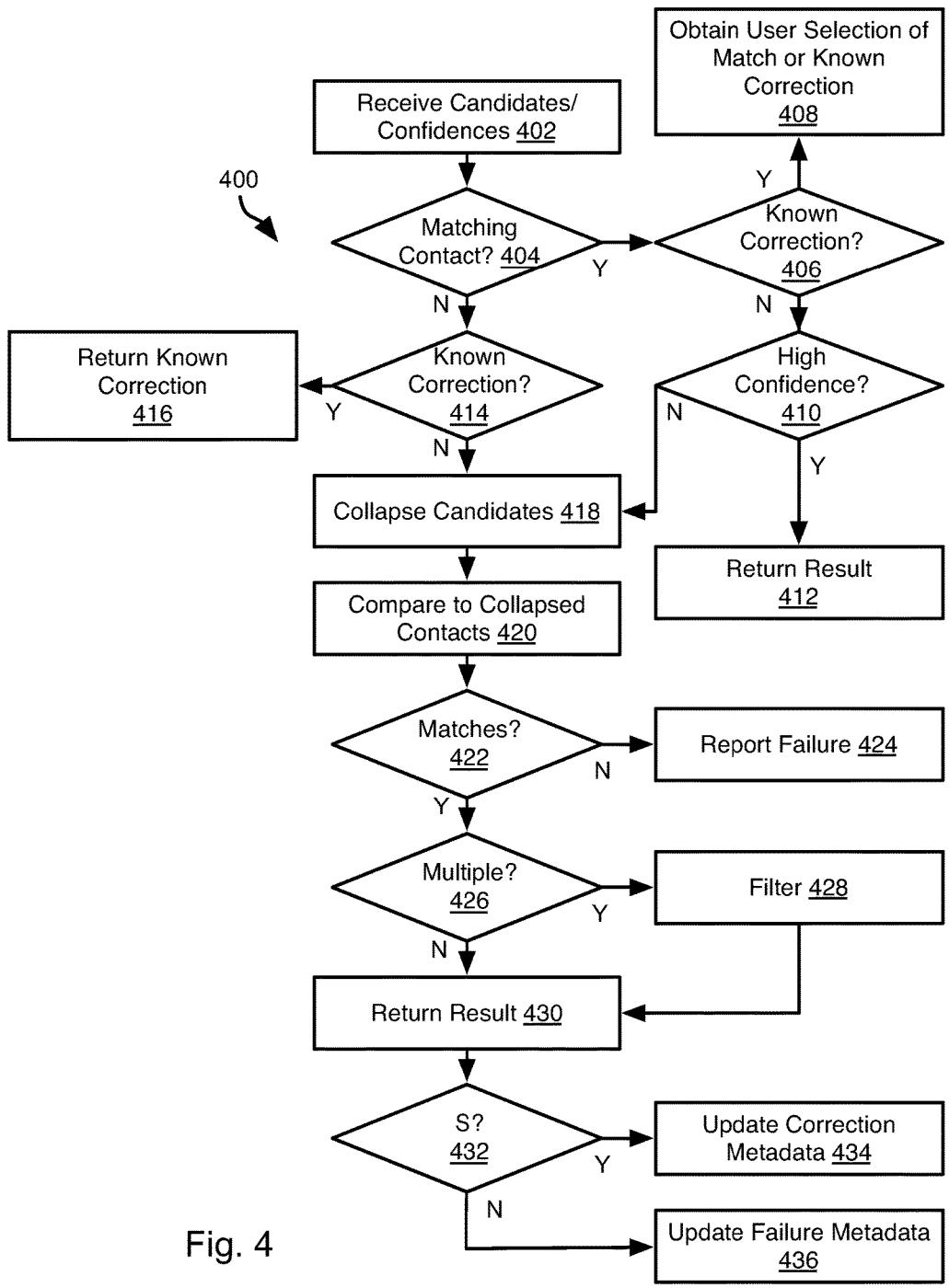
FIG. 4 is a process flow diagram of a method for identifying a contact in voice commands in accordance with an embodiment of the present invention.

Referring to FIG. 4, the illustrated method 400 may be executed by the logic module 310. As noted above, the steps of the method 400 may be executed by the IVI system 104, mobile device 112, or server system 114, or may be distributed among these devices.

The method 400 may include receiving 402 one or more candidate strings 308 and confidence scores corresponding to each of the one or more candidates and evaluating 404 whether any of the one or more candidates match a contact of a user, i.e. the user that is the subject of the method 400. The set of candidates may be a set of contacts included in the contacts and metadata 314. The contacts may be stored in the IVI system 104, the mobile device 112 or in an account of the user accessible to the server system 114 or some other computing device.

If so, the method 400 may include evaluating 406 whether a known correction is stored in the metadata for the matching candidate. In particular, the contacts and metadata 314 may store strings and metadata for strings, where the strings may include both contacts and candidates 308 that have been evaluated according to the method 400. The metadata for a string may include any corrections to that string, i.e. a record of an instance where the string was presented but the user ultimately selected a different string as the desired output. The different string may therefore be stored in the metadata for the string as the correction and the method 400 may therefore include evaluating 406 whether the metadata for the matching contact indicates a different contact.

For example, for each contact or candidate string that is processed according to the method 400, a data structure may be stored that may be of the form <contact or candidate string>, <list_of_corrections>, <collapsed_form>, <successes>, <failures>. These values may be updated according to the method 400 as described below.

If the data structure for the matching contact of step 404 is found to include one or more values in the <list_or_corrections>, the method 400 may include presenting 408 one or more strings in the <list_or_corrections> field to the user. In some embodiments, step 408 may include presenting multiple options for the user to select from, such as some or all of the matching contact identified at step 404, the values in the <list_or_corrections> field for the matching contact, and possibly one or more other strings, such as one or more of other candidate strings received at step 402.

Step 408 may further include storing the selection. For example, if a string in <list_or_corrections> is selected, this selection may be used to increment a number of corrections for that string in the metadata. If another string is selected at step 408 or input by the user, then this value may be stored in the <list_or_corrections> field of the data structure for the matching contact.

If there are no values in the <list_or_corrections> found at step 406, then the method 400 may include evaluating 410 whether the confidence score of the candidate found to match at step 404 exceeds a threshold, e.g. the first threshold. If so, then the matching contact may be returned 412 to the user and/or used in execution of a command. In some embodiments, step 410 may include evaluating the <successes> and <failures> fields for the matching contact. If <successes> exceeds a success threshold, <failures> is below a failure threshold, and/or the ratio of <successes> to <failures> exceeds a ratio threshold, the confidence maybe determined 410 to be high for the matching contact. In some embodiments, a user may provide an input indicating that the matching contact was the correct interpretation or not. This input may be recorded in the metadata for the matching contact. For example, if the user confirms that the result is correct, the <successes> field in the data structure for the matching contact may be incremented. If not, then the <failures> field may be incremented.

If no matching contact is found at step 404, the method 400 may include evaluating 414 whether any data structures are stored for any of the candidate strings received at step 402 and whether a known correction is recorded in the <list_or_corrections> of any of these data structures. If so, then the known correction will be returned 416 to the user and/or used to execute a command. In the case where multiple candidate strings have known corrections in the metadata, step 416 may include returning the multiple known corrections to the user and receiving a selection of one of these corrections. The number of corrections for the selected known correction may be incremented in response to the user selection of it.

If no known correction is found at step 414 or the confidence score is not found 410 to meet the first threshold, then further processing may be performed to attempt to identify a contact.

Figure 5:
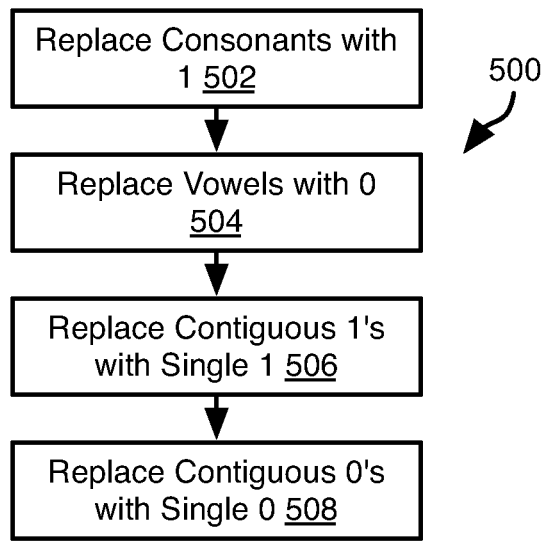
FIG. 5 is a process flow diagram of a method for collapsing a string in accordance with an embodiment of the present invention.

For example, the method 400 may include collapsing 418 the candidate strings. Referring to FIG. 5, collapsing a string may include replacing 502 each consonant with a 1 and replacing 504 each vowel with a 0. In some embodiments, compression may include replacing 506 contiguous 1's with a single 1 and replacing 508 contiguous 0's with a single 0. For example, the name "Peter" would become "10101." An alternative spelling such as "Pieter" would become "100101" after steps 502 and 504 and would become "10101" after steps 506 and 508. In another example, the French name "Thibault" is pronounced exactly the same as "Tebow." The collapsed values of these are identical: "Thibault"→11010011→10101 and "Tebow"→10101.

In some embodiments, steps 502-508 may not be performed as discrete steps. For example, a bit position in an output word may be set to 1 or 0 when a consonant or vowel is encountered and the next bit position will not be set until the opposite character type is encountered. In this manner strings of consonants will result in setting of a single bit value and there is no intermediate storage of multiple bits for multiple contiguous consonants and vowels according to steps 502-504.

Returning to FIG. 4, following collapsing 418, the collapsed forms of the candidate strings may be compared 420 to the collapsed forms of the user's contacts, i.e. the <collapsed_form> fields in the data structures for the user's contacts. If no collapsed forms of the candidate strings match 422 any of the collapsed forms of the user's contacts, then failure may be reported 424. The <collapsed_form> values may be stored in the data structure for each contact and other string represented in the metadata. In this manner, the computation according to the method 400 may be reduced. The comparison of collapsed values is also computationally simple, which enables identification of matches without requiring complex text and speech analysis. In other embodiments, the collapsed form of the contacts and previously-processed strings is computed during execution of the method 400 as needed.

If a match is found 422, and the number of matches is found 426 to be less than a matching threshold, then the contacts having collapsed forms matching the collapsed forms of one or more of the candidate strings may be returned 430 to the user as potential matches and/or used as inputs to a command. If the user is found 432 to select one of the contacts reported at step 430, then the method 400 may include updating 434 the metadata for the one or more candidate strings having a collapsed form matching the selected contact to list the selected contact in the <list_or_corrections> or the number of corrections for the contact may be incremented if the selected contact is already present in <list_or_corrections> for these one or more candidate strings.

If the user is not found 432 to have selected one of the contacts presented at step 430, then failure metadata maybe updated 436. For example, for each candidate string having matching collapsed forms identified at step 422, the <failures> field may be incremented.

If the number of contacts having collapsed forms matching the collapsed forms of the candidate strings is found 426 to exceed the matching threshold, then the matching contacts may be filtered 428. Filtering 428 may be performed according to the method 600 of FIG. 6 or some other filtering criteria. The matching contacts remaining after filtering 428 may then be reported at step 430 and processing may continue as described above.

Figure 6:
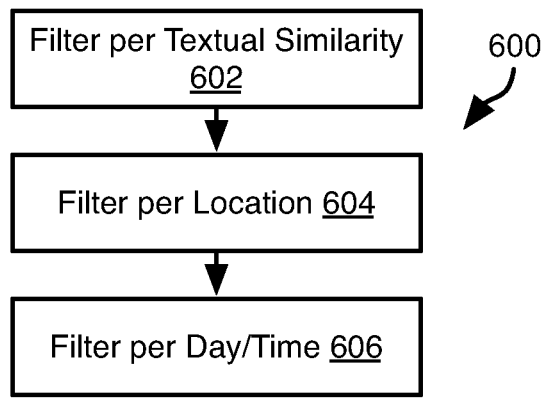
FIG. 6 is a process flow diagram of a method for filtering matching contacts in accordance with an embodiment of the present invention.

Referring to FIG. 6, the illustrated method 600 may be used to select a subset of contacts having collapsed forms matching the collapsed forms of the candidate strings.

The method 600 may further include filtering 602 the matching contacts according to textual similarity to the candidate strings having collapsed forms matching the collapsed forms of the matching contacts. Any metric of textual similarity may be used, such as string edit distance or other approach. Filtering 602 may include removing contacts that do not have a similarity metric with respect to any candidate string that exceeds some threshold metric value.

The method 600 may include filtering 604 the contacts according to location. For example, metadata for a contact may record a location of the user when communication (call, text, email) with that contact occurs, e.g. a region within which X percent, e.g. 90%, of the communications occurred. Filtering 604 may therefore include removing matching contacts that do not have regions including a current location of the vehicle 102 or the mobile device 114 during execution of the method 600.

The method 600 may include filtering 606 the matching contacts according to time. For example, metadata for a contact may record a time window within which communication (call, text, email) with that contact occurs, e.g. a time of day within which X percent, e.g. 90%, of the communications occurred. The metadata may store separate time windows reflecting when communications occurred on different days or types of days (specific day of the week, a weekday, a weekend day). Filtering 606 may therefore include removing matching contacts that do not have time windows including the current time at which the method 600 is being executed. Where day-specific windows are maintained, filtering 606 may include removing matches that do not have the current time within a time window corresponding to the current day of the week or type of day (weekend day or weekday).

FIG. 6 discloses multiple filtering steps 602-606 that may be combined in various ways. For example, the input to one filtering step may be those contacts remaining after a preceding filtering step. Alternatively, each filtering step may result in a score assigned to each contact. For example, a 1 if the filter criteria is satisfied or 0 if the filter criteria is not satisfied by the contact. Alternatively, the score for steps 604, 606 may be a value that increases with proximity of the current location to the region for a contact or proximity of the current time to the appropriate time window, e.g. a day specific time-window for the contact. For step 602, the score may be the textual similarity metric.

For each contact, the scores according to the filtering steps 602-606 may be summed, weighted and summed, or otherwise combined to determine a final score for the each contact. The contacts having the top N (e.g. 2, 3, or 4) final scores or the contacts having final scores exceeding a threshold may be selected as the remaining contacts following the filtering process.

In some embodiments, a subset of contacts is selected according to the filtering per textual similarity at step 602. This subset may then be processed according to steps 604, 606, which may include assigning scores and selecting according to a final score that is combination of the scores from steps 604, 606 in the manner described above.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessorbased or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising performing, by a computer system:
   (a) computing first collapsed values for a plurality of first strings according to a collapsing function;
   (b) receiving two or more second strings from a voice processing algorithm;
   (c) computing second collapsed values for the two or more second strings according to the collapsing function; and
   (d) selecting a selected string of the plurality of first strings having a corresponding first collapsed value matching one of the second collapsed values;
   wherein the collapsing function receives an input string and provides an output string wherein contiguous consonants in the input string are represented with a single instance of a first binary value and contiguous vowels in the input strings are represented with a single instance of a second binary value.

2. The method of claim 1 further comprising:
   evaluating metadata associated with the two or more second strings;
   determining that no corrected string is recorded in the metadata for any of the two or more second strings; and
   performing (c) and (d) in response to determining that no corrected string is recorded in the metadata for any of the two or more second strings.

3. The method of claim 1, wherein receiving the two or more second strings from the voice processing algorithm comprises receiving a confidence score for each second string of the two or more second strings, the method further comprising:
   determining that the confidence scores of all of the two or more second strings fall below a threshold; and
   performing (c) and (d) in response to determining that the confidence scores of all of the two or more second strings fall below the threshold.

4. The method of claim 1, wherein (d) further comprises:
   determining that multiple first collapsed values match one or more matching second values of the second collapsed values;
   (e) in response to determining that multiple first collapsed values match the one or more matching second values, filtering a portion of the first strings corresponding to the multiple first collapsed values to obtain a filtered set of strings; and
   (f) selecting the selected string from the filtered set of strings.

5. The method of claim 4, wherein filtering the portion of the first strings comprises filtering according to a current geographic location and locations at which commands including the portion of the second strings were received.

6. The method of claim 4, wherein filtering the portion of the first strings comprises filtering the portion of the second strings according to a current time and times at which commands including the portion of the second strings were received.

7. The method of claim 4, further comprising:
   determining that a number of the multiple collapsed values exceeds a threshold value;
   performing (e) and (f) in response determining that the number of the multiple collapsed values exceeds the threshold.

8. The method of claim 4, wherein filtering the portion of the first strings comprises filtering the portion of the first strings according to textual similarity to a portion of the second strings corresponding to the one or more matching second values.

9. A system comprising one or more processing devices and one or more memory devices coupled to the one or more processing devices, the one or more memory devices storing executable code effective to cause the one or more processing devices to:
   (a) compute first collapsed values for a plurality of first strings according to a collapsing function;
   (b) receive two or more second strings from a voice processing algorithm;
   (c) compute second collapsed values for the two or more second strings according to the collapsing function; and
   (d) select a selected string of the plurality of first strings having a corresponding first collapsed value matching one of the second collapsed values;
   wherein the collapsing function is programmed to receive an input string and provide an output string wherein contiguous consonants in the input string are represented with a single instance of a first binary value and contiguous vowels in the input strings are represented with a single instance of a second binary value.

10. The system of claim 9, wherein the executable code is further effective to cause the one or more processors to:
    evaluated metadata associated with the two or more second strings;
    perform (c) and (d) only if there is no corrected string recorded in the metadata for any of the two or more second strings.

11. The system of claim 9, wherein the executable code is further effective to cause the one or more processors:
    to receive the two or more second strings from the voice processing algorithm comprises receiving a confidence score for each second string of the two or more second strings;
    if the confidence scores of all of the two or more second strings fall below a threshold, perform (c) and (d).

12. The system of claim 9, wherein the executable code is further effective to cause the one or more processors to perform (d) by:
    if multiple first collapsed values match one or more matching second values of the second collapsed values:
       (e) filtering a portion of the first strings corresponding to the multiple first collapsed values to obtain a filtered set of strings; and
       (f) selecting the selected string from the filtered set of strings.

13. The system of claim 12, wherein the executable code is further effective to cause the one or more processors to filter the portion of the first strings by filtering according to a current geographic location and locations at which commands including the portion of the second strings were received.

14. The system of claim 12, wherein the executable code is further effective to cause the one or more processors to filter the portion of the first strings by filtering the portion of the second strings according to a current time and times at which commands including the portion of the second strings were received.

15. The system of claim 12, wherein the executable code is further effective to cause the one or more processors to, if a number of the multiple collapsed values exceeds a threshold value, perform (e) and (f).

16. The system of claim 12, wherein the executable code is further effective to cause the one or more processors to filter the portion of the first strings by filtering the portion of the first strings according to textual similarity to a portion of the second strings corresponding to the one or more matching second values.

* * * * *